United States Patent [19]

Mayer

[11] Patent Number: 5,611,169
[45] Date of Patent: Mar. 18, 1997

[54] LONGLINE SNAP

[76] Inventor: James E. Mayer, Juneau, Ak. 99803

[21] Appl. No.: 388,400

[22] Filed: Feb. 14, 1995

[51] Int. Cl.⁶ .................................................. A01K 79/00
[52] U.S. Cl. ........................ 43/44.84; 43/44.85; 24/600.9
[58] Field of Search ................................ 43/44.84, 44.85, 43/42.74, 42.49; 24/600.9, 601.9, 908, 607, 600.3

[56] References Cited

U.S. PATENT DOCUMENTS

| | | | |
|---|---|---|---|
| 149,751 | 4/1874 | Hall | 24/600.9 |
| 234,716 | 11/1880 | Moulton | 24/600.9 |
| 461,332 | 10/1891 | Guilbert | 24/601.9 |
| 486,641 | 11/1892 | Grantland | 24/600.9 |
| 542,803 | 7/1895 | Palmer | 43/44.84 |
| 586,397 | 7/1897 | Rock | 24/600.9 |
| 843,748 | 2/1907 | Harris | 43/44.85 |
| 953,714 | 4/1910 | Ross | 24/600.9 |
| 1,793,417 | 2/1931 | Roberts | 24/600.9 |
| 1,844,652 | 2/1932 | Harley | 43/44.85 |
| 1,905,449 | 4/1933 | Dunn | 43/44.85 |
| 2,060,007 | 11/1936 | Galbraith | 43/44.85 |
| 2,466,939 | 4/1949 | Fowler | 43/44.85 |
| 2,513,256 | 6/1950 | Sonnenburg | 24/600.9 |
| 2,564,260 | 8/1951 | Houser | 43/44.85 |
| 4,524,535 | 6/1985 | Bates | 43/44.84 |
| 4,862,633 | 9/1989 | Hague | 43/44.84 |

FOREIGN PATENT DOCUMENTS

| | | | |
|---|---|---|---|
| 47698 | 11/1931 | Norway | 43/44.85 |

*Primary Examiner*—Kurt Rowan
*Attorney, Agent, or Firm*—Michael J. Ram; Marvin H. Kleinberg; Marshall A. Lerner

[57] ABSTRACT

A clip for attaching a fishing hook to an elongated line, the clip having a first portion configured to clamp onto the line, the hook being attached to the clip at a second end spaced from the first portion. The clip further includes first, second and third legs extending from the first portion, the third leg having a camming portion such that pressing the line against an external surface of the camming portion and pulling the clip toward the hook attachment point results in the line becoming inserted into the first portion and pressing the line against an internal surface of the camming portion and pushing the clip in a direction opposite of the hook attachment point results in the line being released from the clip.

6 Claims, 4 Drawing Sheets

LONGLINE SNAP

BACKGROUND OF THE INVENTION

1. Field of the Invention

The present invention relates to the field of long line fishing gear and more particularly to an improved closure to attach a ganglion to a long line. More generally, the present invention relates to closure devices and more particularly to an improved method of removably attaching an object to a line.

With many commercial fishing arrangements a main fishing line or long line is set, cast or dragged from a boat. The long line has a plurality of hooks attached to it at predetermined intervals. There are several methods of attaching hooks to the line. The main method is to provide a plurality of short lines and to attach one or more hooks to each short line, this setup being referred to as a ganglion. The short lines are then removably attached to the long line.

A commercial fisherman feeds long lines into the water and retrieves them from the water many times a day. As the long line is fed out, each ganglion is attached to it and, as the long line is retrieved, each ganglion must be disengaged from the long line. This is done so that the long line can be retrieved mechanically by winding the line onto a reel on the boat without the line becoming tangled. It also tends to prevent the workers from becoming caught on the hooks and allows for the storage of very long lines in small spaces.

Ganglions are attached to long lines by either tying the ganglions directly to the long line (conventional gear) or by tying the ganglions to a ganglion "snap clip" and then fixing the ganglion snap clip onto the long line. Untying ganglions on a conventional line is very difficult and time consuming for the fisherman and therefore is only done when the boat is in port. At sea, however, broken or twisted ganglions may have to be retied. Therefore ganglion snaps have come into use.

2. Description of the Related Art

A typical ganglion snap has been shown in FIG. 2 of the patent to Hague et al, U.S. Pat. No. 4,862,633. A similar snap is shown in FIG. 3 of the patent to Bates, U.S. Pat. No. 4,524,535.

A severe shortcoming of the prior art snaps is that these snaps, including that shown in Bates, require a squeezing or compression of the members to attach or release the snap to or from the line. This repetitive manipulation results in fatigue, soreness, and muscle strain and has been considered a cause of carpal tunnel syndrome in many fisherman.

Thus, there is a need for a simple, rapid, and non-strenuous method of attaching and disengaging the ganglions.

SUMMARY OF THE INVENTION

These needs are met by the present invention which comprises an improved connecting device or snap for affixing attachments on a line. A line refers to any long piece of material where the diameter is small and includes a filament, rope, cable, wire or ribbon. The improved snap mechanism can be attached to a line merely by pulling the snap at right angles to the line, without squeezing. Further, and in contrast to the above described prior art, disengaging the snap only requires a push in the opposite direction of the pull. In particular, pushing the snap perpendicular across the line in the direction opposite from that used to attach the snap disengages the snap from the line. This design eliminates the squeezing required by the prior art ganglion snaps.

Accordingly, it is an object of the present invention to provide a long line snap that can be attached and detached from a line by a motion in a direction orthogonal to the direction of the line.

It is an additional object of this invention to provide a long line snap that can be easily fabricated from one sheet of material or a coil of wire.

It is yet an additional object of this invention to provide a simple one piece snap mechanism that is easily engaged and disengaged from a line by a movement of the snap at right angles to the line with which it is associated.

BRIEF DESCRIPTION OF THE DRAWINGS

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DESCRIPTION

Figure 1:
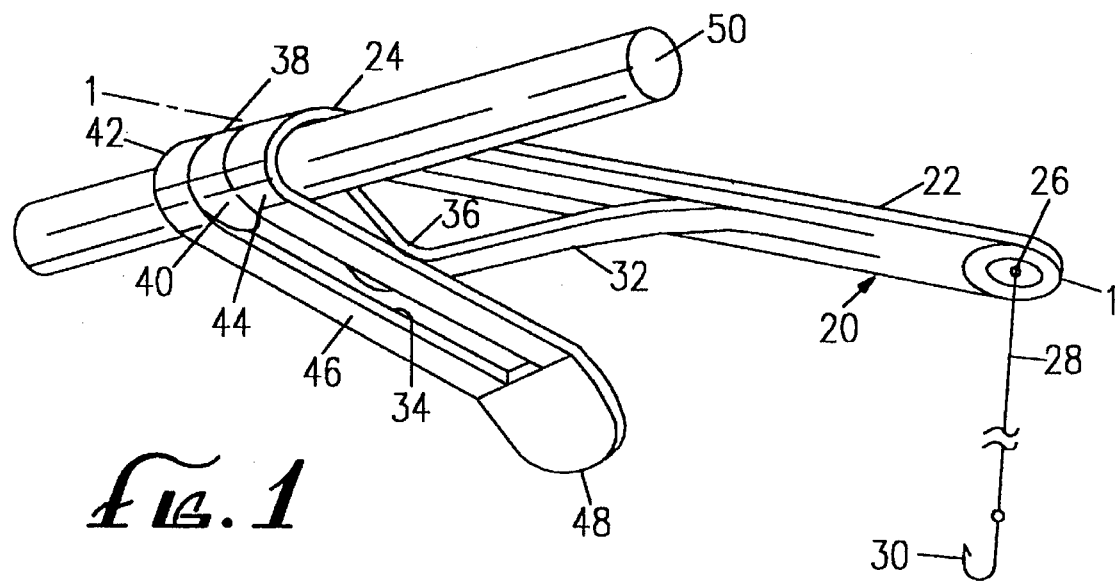
FIG. 1 is a perspective side view of a first embodiment of a long line snap incorporating features of the present invention.
Figure 4:
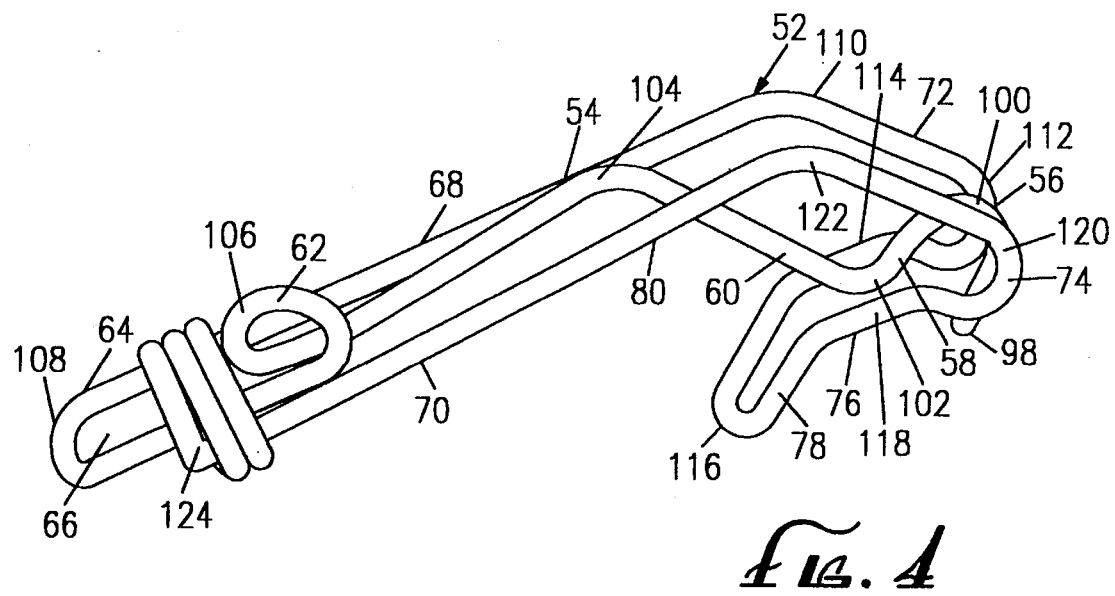
FIG. 4 is a top perspective side view of a first alternative snap according to the present invention.

FIG. 1 is a perspective side view of a preferred embodiment of a long line snap 20 according the present invention. The snap 20 is made from a single piece of a suitable material. For example, a sheet of metal can be cut or stamped as shown in FIG. 1, a plastic material, such as reinforced nylon, may be injection molded, cast, stamped or the snap can be formed from bent metal rod into the desired configuration as shown in FIG. 4. The snap 20 is composed of a handle 22 at one end and a securing portion 24 at the opposite end; the handle 22 preferably having a width substantially greater than its thickness.

The handle 22 has attachment means such as a hole 26 through which a ganglion line 28 can be fed or an area 26 to which such a ganglion line can be removably attached by a nut and bolt, a tied line, a clasp, hanger, nail, screw or adhesive. The edge of this hole/area 26 is deburred and covered by a smooth material or otherwise protected so that a ganglion line 28 will not be worn by sharp edges. The ganglion line 28 with a hook 30 can be fed through the hole 26 and the ganglion line 28 can be tied to itself or otherwise secured to the snap 20.

The securing portion 24 of the snap 20 contains two elements forming the snap 20 mechanism, a central strip spring clamp 32 and an exterior clamp surface 34. The central spring clamp 32 is an elongated piece located along the central axis 1—1 of the snap and extending from the handle 22 away from the hole 26. The spring clamp 32 has a first, gradual slope starting at the point of attachment to the handle 22 angling downward from the central axis to a nadir 36. From the nadir 36, the spring clamp 32 slopes with a sharp angle upward to an apex 38 on the central axis 1—1. Continuing past the apex 38, the spring clamp 32 curves into a hook or U-shaped curved area 40 of a diameter appropriate for the material to which the snap 20 will be attached, which will secure a long line 50 between the spring clamp 32 and exterior clamp surface 34 in the clamping area 42.

The exterior clamp surface 34 is shaped so that it properly guides the long line 50 into the clamping area and serves as a surface by which the spring clamp 32 can secure the long line 50. The exterior clamp surface 34 starts out at the handle 22 coplanar and coextensive with the central axis 1—1 and continues in this manner until it is beyond the hook 40 of the clamp surface 34. At that point it curves downward from the central axis 1—1 in a smooth curve 44 to a support plate 46 which ends in a line guide 48 across which the long line 50 can be drawn.

Figure 2:
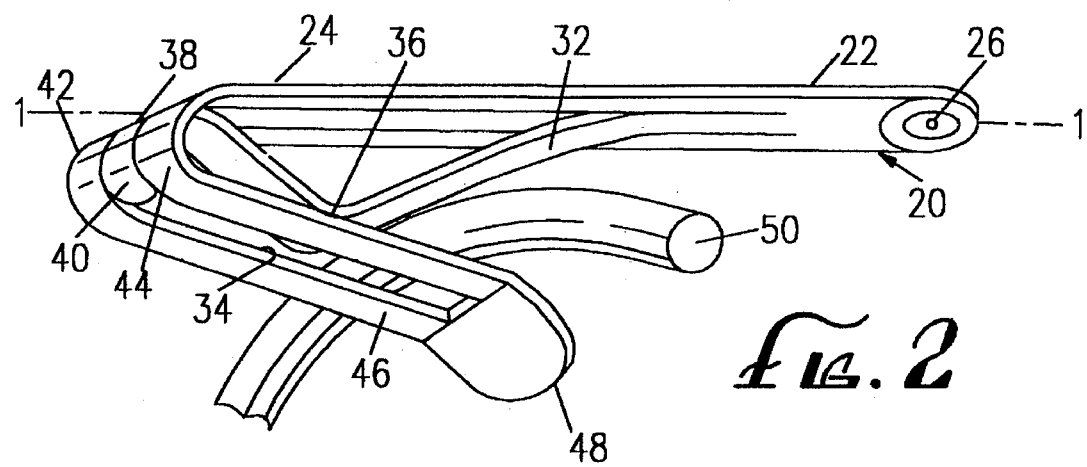
FIG. 2 is a perspective side view of the snap of FIG. 1 prior to the insertion of a line.
Figure 3:
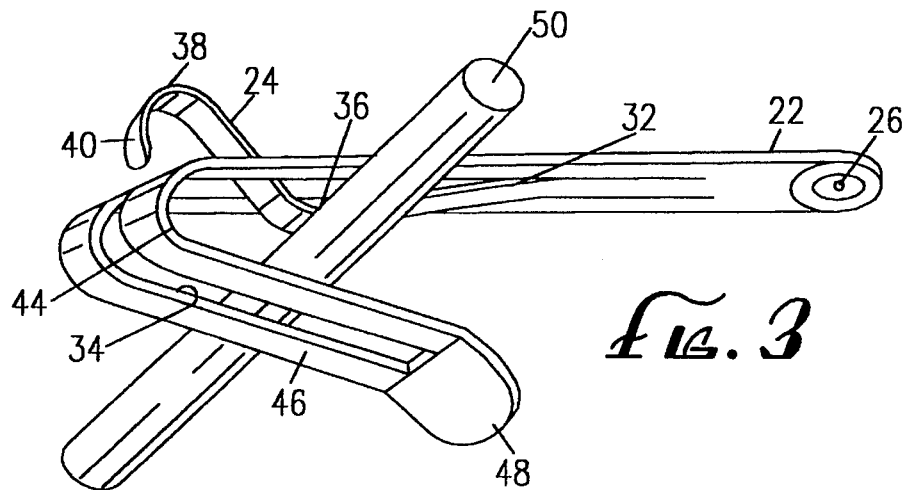
FIG. 3 is a perspective side view of the snap of FIG. 1 with a line in the process of being inserted.

The particular embodiment shown in FIGS. 1–3 is formed from a single piece of an initially planar material having a length and a width, the legs being integral at the handle portion 22 of the clip and extending along the length of the material in the same plane.

The first and second leg are bent at a point spaced from the handle portion of the clip 20 to form a rounded enclosure, the first and second leg having a second bend at a point spaced along the material further from the handle portion 22 of the clip 20 than the rounded enclosure 44, said second bend being formed in a direction opposite to the direction of the bend forming the rounded enclosure 44, to create the support plate 48 for the line.

The third leg 32 is displaced from the plane of the first and second leg, in a region adjacent to the handle portion 22 of the clip, the displacement of the third leg being toward the second bend in the first and second leg such that the third leg passes between the first and second leg and intersects the plane of the first and second leg in the region between the rounded enclosure and the second bend therein, the third leg 32 having a knee shaped bend 36 at said intersection of the third leg with the first and second leg, said knee shaped bend 36 causing the third leg 32 to additionally pass between the first and second leg at a point between the handle portion of the clip and the rounded enclosure in the first and second leg, the third leg 32 having a rounded bend 40 therein coinciding with and corresponding to the bend forming the rounded enclosure in the first and second leg.

The operation of the snap 20 of the present invention is illustrated in FIGS. 2 and 3. As shown in FIG. 2, the snap 20 is attached to a line 50 by placing the line 50 on the guide 48 and pulling the snap 20 perpendicular to the axis of the line. As the snap 20 is pulled across the line, the spring clamp 32 is cammed upward to open a space between the spring clamp 32 and the exterior clamp 34.

This camming action is better seen in FIG. 3 which shows the line 50 at the point of maximum separation between the central spring clamp 32 and the exterior clamp 34 portion. In this position the line 50 sits directly upon the locking plate 46. The separation allows movement of the line into the curve 44 of the exterior clamp 34.

When the line 50 is pulled fully into the curve 44, the spring clamp member 32 is released and moves to align itself adjacent to the surface of the locking plate 46 as shown in FIG. 1. When the line 50 is in this position, it is locked in place since all forces on the snap 20 will be directed in the same direction used to secure the line 50. The U-shaped hook area 40, the curve 44, and the locking plate 46, between which the long line 50 is gripped, are jointly referred to as the gripping surfaces of the snap 20.

To release the line 50, the snap 20 is pushed towards the line 50, in the direction opposite to the one used to grasp the line 50. The surface of the spring 32 between the apex 38 and the nadir 36 becomes an exit camming surface which causes the spring clamp 32 to move toward the securing portion 24 (FIG. 1), permitting the line to pass between the spring clamp 32, exterior clamp 34, and the U-shaped hook area 40, over the locking plate 46 and ultimately freeing the snap 20 from the line 50.

This allows fisherman to operate the snap 20 without squeezing a spring member and thus permits the frequent attaching and disengaging of ganglions with hooks free from causing the strain and fatigue causing activity otherwise required from prior art snaps. The snap 20 of the present invention is attached or released by merely pulling or pushing it across a line.

An alternative embodiment of the present invention using a wire of spring steel is shown in FIGS. 4–7. This embodiment can be fabricated from a single length of wire which is appropriately bent and twisted into the desired shape. The gauge of the wire can be selected depending upon the stresses to which the snap 52 will be subjected, saving in both weight and material.

As shown in FIG. 4, a snap 52 can be created by forming the free end of a spring arm 54 into a U-shaped locking portion 56. The inner side of the locking portion 56 forms a exit camming surface 58. The spring 54 is then bent inward to form an entrance camming surface 60 which continues to another bend. The remaining part of the spring arm 54 can be bent into a loop 62 which provides the spring force.

The wire is then bent to form the back of the snap 64 which in turn forms a hole 66. As the wire extends forward it forms a first arm 68 of the base portion 70 which consists of two parallel arms. The two arms of the base portion 70 located on either side of the spring arm 54 and is bent to form the receiving end 72 of the snap 52. A substantially U-shaped curve 74 provides the primary hold on the line. The wire then extends in a straight segment forming a locking portion 76 which accommodates the apex of the spring exit and entrance camming surfaces 58, 60. The wire is bent outward to provide a line entry guide area 78 and then curves in a U-turn at 180° to its previous direction to form the second arm 80 of the base portion 70. The path of the wire parallels that of the first arm 68 and, at a point behind the loop 62 of the spring arm 54, the wire is wrapped around the back 64 of the snap 52 leaving the hole 66 uncovered.

The back 64 of the snap 52 can leave an aperture 66 through which the ganglion can be attached or the ganglion can utilize the spring loop 62 as an attaching loop. Over the back 64 of the snap 52, the loop 62 and a portion of the spring arm 54 a sheath (not shown) can be attached which can protect a person's hand when operating the snap 52.

Referring to FIGS. 4–7, the snap, fabricated from a single wire, has formed therein serially along its length, starting from a first end 98:

a line enclosing (first) bend 100 a second bend 102 having a knee shape and being opposite in direction to the line enclosing bend 100 a third bend 104 having a knee shape and being opposite in direction to the second bend 102, a fourth bend 106 forming a 360° loop, a fifth bend 108 constituting 180° such that the wire beyond the fifth bend 108 runs along the wire extending between the third and fourth bend 104, 106, the wire portion between the first end 98 and the fifth bend 108° constituting a central leg or spring arm 54, a sixth bend 110 at a point further from the fifth bend 108 than the third bend 104, said sixth bend 110 causing the wire to extend approximately parallel to the wire extending between the second and third bend 102, 104, a seventh bend 112 approximating 180° being located adjacent to the (first) bend 100 such that the first bend and the seventh bend 112 combine to form a U-shaped enclosing portion 74, an eighth bend 114 opposite in direction to the seventh bend 112, a ninth bend 116 of 180° such that the wire portion between the fifth bend 108 and the ninth bend 116 constitutes a first outer leg 68, the 180° ninth bend 116 being the start of a second outer leg 80, the wire of the second outer leg 80 running next to and having the same appearance as the first outer leg 68 but spaced from the first outer leg 68 with the central leg located between the first outer leg 68 and the second outer leg 80, the wire portion forming the second outer leg 80 having a tenth bend 118, eleventh bend 120 and twelfth bend 122 corresponding respectively to the eighth bend 114, seventh bend 112 and sixth bend 110 respectively, a thirteenth bend 124 located between the fourth bend 106 and fifth bend 108, said thirteenth bend 124 being approximately 90°, the wire thereafter being wound for at least 360° around the central leg and the first outer leg 68 between the fourth bend 106 and the fifth bend 108 and terminating in a second end at a point near the thirteenth bend 124.

Figure 5:
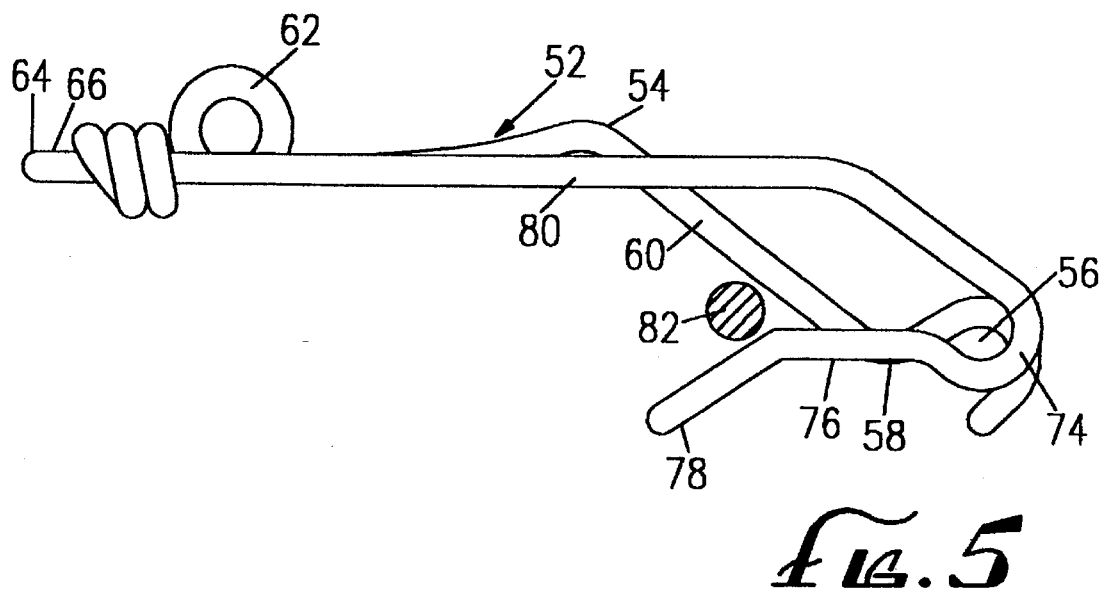
FIG. 5 is a side view of the snap of FIG. 4 just prior to the insertion of a line.
Figure 6:
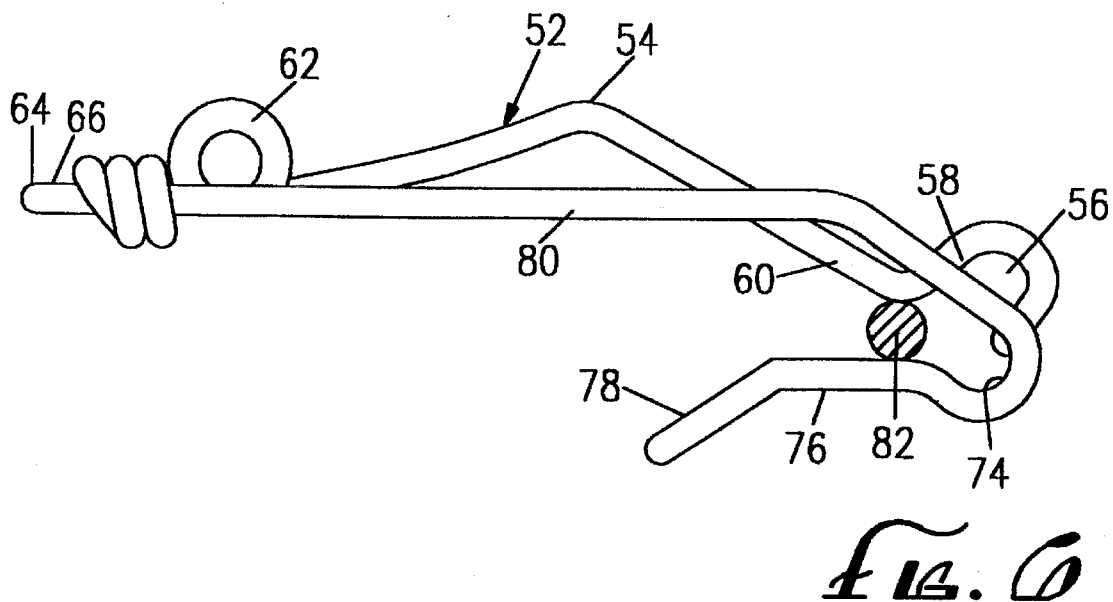
FIG. 6 is a side view of the snap of FIG. 4 with a line in the process of being inserted.
Figure 7:
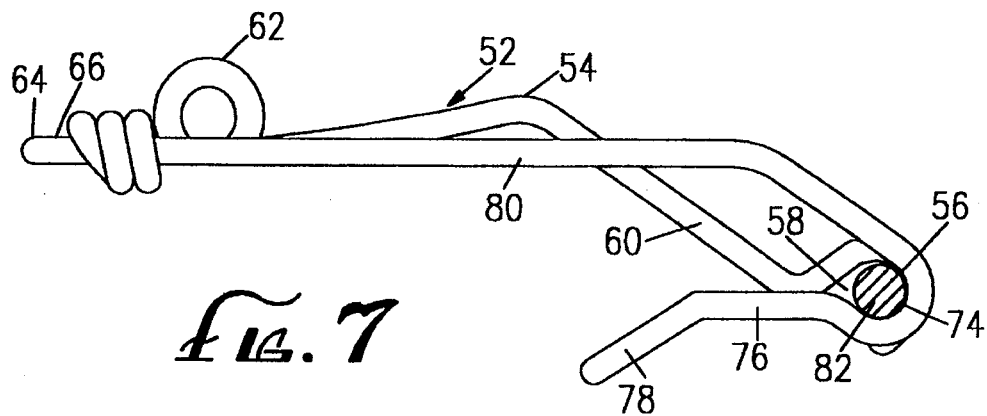
FIG. 7 is a side view of the snap of FIG. 4 with a line inserted.

The operation of the alternative snap 52 of FIG. 4 is illustrated in FIGS. 5–7. As shown in FIG. 5, the snap 52 is attached to a line 82 by placing the line 82 on the guide 78 and pulling the snap 52 perpendicular to the axis of the line 82. As the snap 52 is pulled across the line 82 the entrance camming surface 60 is cammed upward to open a space between the spring arm 54 and the locking portion 76. This is shown in FIG. 6 which illustrates the line 82 at the point of maximum separation between the spring arm 52 and the locking portion 76. In this position the line 82 sits directly upon the locking portion 76. The separation allows movement of the line into the U-shaped line enclosing hook area 56 of the spring arm 54 and the U-shaped curve 74 of the first and second arms 68, 80.

When the line 82 is fully pulled into the U-shaped curve area 76, the spring clamp member is released and moves below the upper surface of the locking portion 76, as shown in FIG. 7. When the line 82 is in this position, it is locked in place, since all pulling forces on the snap 52 will be directed in the same direction as the force applied to secure the line 82.

To release the line 82, the snap 52 is grasped and pushed toward the line 82 in the direction opposite to the one used to attach the snap 52 to the line 82. The line 82 pressing against the exit camming surface 58 causes the spring arm 54 to move away from the locking portion 76, permitting the line to pass out of the U-shaped hook area 56, move between the exit camming surface 58, the U-shaped curve 74, and over the locking portion 76 and past the line entry guide area 78 which ultimately frees the line 82 from the snap 52.

Figure 8:
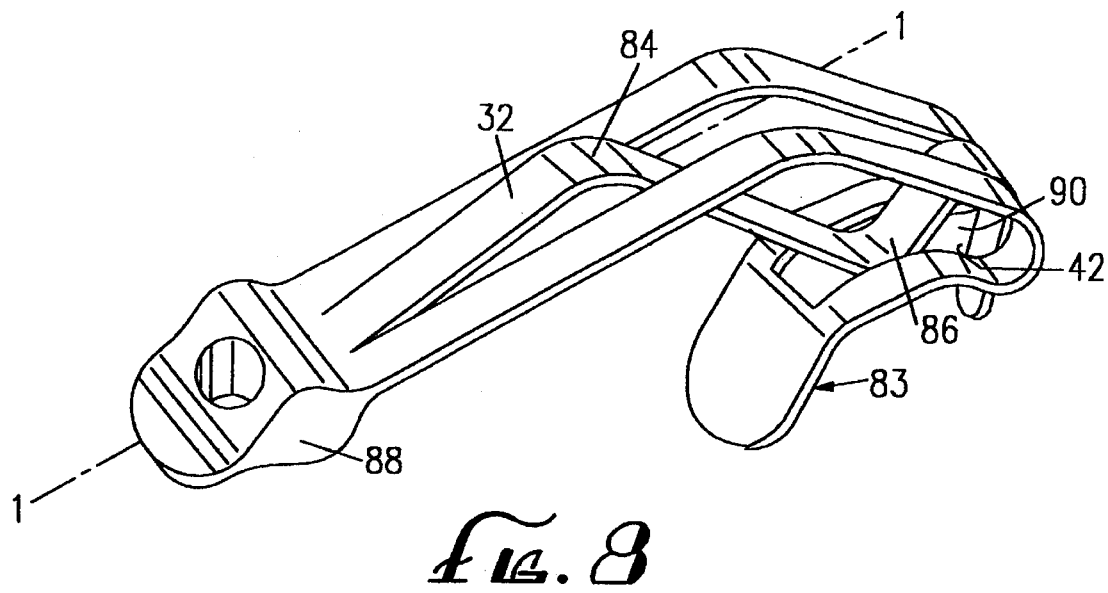
FIG. 8 is a perspective top view of a second alternative snap according to the present invention.

A second alternative embodiment snap 83 of the present invention which has a thicker handle 88 and additional bends when compared to FIG. 1, is pictured in FIG. 8. This design is preferentially formed from a molded plastic such as nylon or polypropyene. The center spring clamp 32 first rises above the central axis 1—1 of the snap 83 until the downward bend 84, which is located in the center spring clamp 32. Beyond bend 84 the spring clamp 32 angles downward and below the central axis 1—1. This bend 84 may add more spring for certain materials. The spring clamp 84 then has an upward bend 86 approximately three quarters of the way between the handle and the clamping area 42.

When compared to the embodiment of FIG. 1, this embodiment includes additional bends, equivalent to the sixth bend 110 and twelfth bend 122 of FIGS. 4–7.

The clip includes an additional bend in the first and second leg, said additional bend being located between the clip handle portion and the rounded enclosure, the additional bend being in the same direction as the bend forming the rounded enclosure but being of a lesser magnitude.

Also, the third leg has a second knee shaped bend at the point between the clip handle portion and the first and second leg third bend, the second knee causing the third leg to extend approximately parallel to the first and second legs in the area between the additional bend and the rounded enclosure.

To give the long line (not shown) a defined area to sit in when attached, a cupped area 90 is formed in the exterior clamp 46 above the locking plate. For some materials, a thickened handle 88 is desired to allow a person to better grasp the snap 83.

Although the present invention has been described in considerable detail with reference to certain preferred versions and uses thereof, other versions and uses are possible. For example, the snap can be used in any situation where a clasp must be attached to a loop or strip of material. This loop of material would replace the line 50 or 82 in the above description. This loop or line could be a clothes line, a water skiing line, a grappling ring (for climbing), a ring (attached for example to a luggage bag), a key ring, a metal bar (for example for a swing), a kite string loop or a picture wire (hanging a picture).

In the clothes line embodiment, a triangle shaped hanger body is attached via the hole 26 or injection molded to the snap so it replaces the hole 26. For water skiing, the line can be the lead line from the ski boat and the hole 26 has a bar through it for the skier to hold into.

To aid in rock climbing, a piton is driven into a rock face and carabineers are used to attach the piton to a climber's lines. With this invention the snap attached to a climbing rope or gear can be connected to the piton and/or carabineer. On luggage, there are often rings permanently attached to the luggage to which a detachable shoulder strap can be attached via the snap. In the luggage embodiment the hole 26 would be widened for a strap to be attached there through.

Therefore, the spirit and scope of the invention should only be limited by the scope of the claims appended hereto.

What is claimed is:

1. A snap for attaching a device to an elongated line, the snap having, at a handle portion, means to attach the device, and at a securing portion, clamping structure configured to temporarily enclose the line within a line enclosing portion of the snap, the snap comprising a first, a second and a third leg, the first and second legs extending longitudinally from the handle portion of the snap in a substantially parallel manner, in the same plane and having substantially the same configuration, and the third leg extending longitudinally from the handle portion in a space between the first and second legs, the legs cooperating to grasp the line in the space formed between the first and second leg acting together and the third leg, said space constituting the line enclosing portion, the line being inserted into the line enclosing portion by pressing the line against an entrance camming surface in the third leg and an entry portion formed on the first and second leg and being removed from the space by pressing the line against an exit camming surface in the third leg, said exit camming surface constituting the third leg portion of the line enclosing portion, the clip being formed from a single piece of an initially planar material having a length and a width, the legs being integral at the handle portion of the clip and extending along the length of the material in the same plane, the first and second leg being bent at a point spaced from the handle portion of the clip to form a rounded enclosure, the first and second leg having a second bend at a point spaced along the material further from the handle portion of the clip than the rounded enclosure, said second bend being formed in a direction opposite to the direction of the bend forming the rounded enclosure, to create a support plate acting as an entry guide for the line, the third leg being displaced from the plane of the first and second leg, in a region adjacent to the handle portion of the clip, the displacement of the third leg being toward the second bend in the first and second leg such that the third leg passes between the first and second leg and intersects the plane of the first and second leg in the region between the rounded enclosure and the second bend therein, the third leg having a knee shaped bend at said intersection of the third leg with the first and second leg, said knee shaped bend causing the third leg to additionally pass between the first and second leg at a point between the first portion of the clip and the rounded enclosure in the first and second leg, the third leg having a rounded bend therein coinciding with and corresponding to the bend forming the rounded enclosure in the first and second leg.

2. The clip of claim 1 further including a third bend in the first and second leg, said third bend being located between the clip handle portion and the rounded enclosure, the third bend being in the same direction as the bend forming the rounded enclosure but being of a lesser magnitude, the third leg having a second knee shaped bend at the point between the clip handle portion and the first and second leg third bend, the second knee causing the third leg to extend approximately parallel to the first and second legs in the area between the third bend and the rounded enclosure.

3. The clip of claim 1 wherein the first and second legs are connected by a flat area in the entry region to form a flat platform to guide the line into the clip.

4. The clip of claim 2 wherein the first and second legs are connected by a flat area in the entry region to form a flat platform to guide the line into the clip.

5. The clip of claim 1 formed from a single piece of wire bent to form the means to attach to the device, the first, second and third leg, the line enclosing portion and the entry portion.

6. A snap for attaching a device to an elongated line, the snap having, at a handle portion, means to attach the device, and at a securing portion, clamping structure configured to temporarily enclose the line within a line enclosing portion of the snap, the snap comprising a first, a second and a third leg, the first and second legs extending longitudinally from the handle portion of the snap in a substantially parallel manner, in the same plane and having substantially the same configuration, and the third leg extending longitudinally from the handle portion in a space between the first and second legs, the legs cooperating to grasp the line in the space formed between the first and second leg acting together and the third leg, said space constituting the line enclosing portion, the line being inserted into the line enclosing portion by pressing the line against an entrance camming surface in the third leg and an entry portion formed on the first and second leg and being removed from the space by pressing the line against an exit camming surface in the third leg, said exit camming surface constituting the third leg portion of the line enclosing portion, the snap being fabricated from a wire, the wire having formed therein serially along its length, starting from a first end:

a first bend constituting a line enclosing portion a second bend, said bend having a knee shape and being opposite in direction to the line enclosing bend, a third bend, said bend having a knee shape and being opposite in direction to the second bend, a fourth bend forming a 360° loop, a fifth bend constituting 180° such that the wire beyond the fifth bend runs along the wire extending between the third and fourth bend, the wire portion between the first end and the fifth bend constituting a central leg, a sixth bend at a point further from the fifth bend than the third bend said sixth bend causing the wire to extend approximately parallel to the wire extending between the second and third bend, a seventh bend approximating 180° being located adjacent to the first bend such that the first bend and the seventh bend combine to form a U-shaped enclosing portion, an eighth bend opposite in direction to the seventh bend, a ninth bend of 180° such that the wire portion between the fifth bend and the ninth bend constitutes a first outer leg, the ninth bend being the start of a second outer leg, the wire of the second outer leg running next to and having the same appearance as the first outer leg but spaced from the first outer leg with the central leg located between the first outer leg and the second outer leg, the wire portion forming the second outer leg having a tenth, eleventh and twelfth bend corresponding respectively to the eighth, seventh and sixth bend, a thirteenth bend located between the fourth and fifth bend, said thirteenth bend being approximately 90°, the wire thereafter being wound for at least 360° around the central leg and the first outer leg between the fourth bend and the fifth bend the wire terminating thereafter.

* * * * *